United States Patent [19]

Matsuzaki

[11] 4,442,885

[45] Apr. 17, 1984

[54] CONTROL SYSTEM FOR AIR CONDITIONER OF MOTOR VEHICLE

[75] Inventor: Yoshitomi Matsuzaki, Yokohama, Japan

[73] Assignee: Nissan Motor Company, Limited, Yokohama, Japan

[21] Appl. No.: 357,480

[22] Filed: Mar. 12, 1982

[30] Foreign Application Priority Data

Mar. 14, 1981 [JP] Japan ................... 56-35973

[51] Int. Cl.[3] ............... F25B 29/00; H01C 10/36
[52] U.S. Cl. ............................ 165/25; 62/163; 236/1 C; 338/172
[58] Field of Search .............. 165/25, 26, 27, 43; 62/163; 236/1 C; 338/172, 198, 68

[56] References Cited

U.S. PATENT DOCUMENTS 2,794,103  5/1957  Moore et al. ............... 338/172
3,411,713  11/1968  Wallace et al. ............. 336/15 A X Primary Examiner—William E. Wayner
Attorney, Agent, or Firm—Schwartz, Jeffery, Schwaab, Mack, Blumenthal & Koch

[57] ABSTRACT

In a control system for an air conditioner of a motor vehicle, which includes an automatic control circuit arrangement for controlling the air conditioner to enable it to operate at a desired level of the heating or cooling performance thereof, there is provided an emergency circuit arrangement which is adapted, in case the automatic control circuit arrangement fails to work properly, for example, to cause it to be disconnected from the air conditioner and enable the latter to operate only at the maximum level of the heating or cooling performance thereof. There is also provided a switch device which is connected to selectively render operative a desired one of the above two circuit arrangements, and provided with means for preventing the emergency circuit from being unintentionally rendered operative.

4 Claims, 10 Drawing Figures

CONTROL SYSTEM FOR AIR CONDITIONER OF MOTOR VEHICLE

BACKGROUND OF THE INVENTION

1. Field of the Invention

The present invention relates generally to a control apparatus for an air conditioner of a motor vehicle. In particular, the invention concerns improvements in or relating to a control system for a fully automatized air conditioner adapted to automatically control temperature, quantity and the like of air to be blown into the passenger compartment of a motor vehicle.

2. Description of the Prior Art

As schematically illustrated in FIG. 1, the hitherto known air conditioner of the kind mentioned above is usually provided with an automatic control circuit 1 which is adapted to automatically control temperature and air quantity for the passenger compartment of a motor vehicle as well as the selection of air flow outlet ports and the like. Further, to cope with an emergent event such that the controlling operation of the automatic control circuit 1 fails to work there is provided an emergency circuit 2 in addition to the automatic control circuit 1 for assuring operation of at least the fundamental functions of the air conditioner, i.e. maximum heating and cooling capabilities. The failure in operation of the automatic control circuit 1 may result, for example, from a malfunction of the control circuit itself, failure of the external temperature sensor, interior temperature sensor and/or elements supplying relevant input signals to the control circuit 1. The automatic control circuit 1 and the emergency circuit 2 are arranged to be selectively changed over by means of a manipulating switch 3. In FIG. 1, reference numeral 4 denotes a power supply source such as a battery.

In the automatically controlled air conditioning system of the arrangement outlined above, the manipulating switch 3 takes the form of an integral structure with a temperature control switch 5, as is indicated by a reference symbol 3 (5) in FIGS. 2 and 3. Switch 5 inherently functions to select and preset a given temperature for the air flow produced by the air conditioner. More particularly, the manipulating switch 3 (5) is operative not only over a temperature control range T but also at emergency positions FH and FC. Describing in more concrete the structure of this switch by referring to FIG. 3, it includes a base plate 6 in the form of an annular disc 6 on which an arcuate resistance layer 7 is provided and electrically connected to the automatic control circuit 1. There are further provided, in the vicinity of the opposite ends of the arcuate resistance strip 7, emergency contacts 8H and 8C (corresponding to the emergency positions FH and FC shown in FIG. 2), respectively, which are connected to the emergency circuit 2 for assuring the maximum heating or cooling function of the air conditioner, in case of emergency (i.e. upon occurrence of the emergent conditions described above). On the other hand, a manipulating knob 9 is mounted rotatably relative to the base plate 6, and it is provided with a movable contact piece 10 which is adapted to be slidably displaced in contact with the base plate 6, as the manipulating knob 9 is revolved. When the manipulating knob 9 is operated within the temperature control range T, the movable contact piece 10 is slidably displaced on the resistance layer 7 to establish a corresponding resistance value on the basis of which the automatic control circuit 1 in turn is operated. On the other hand, when the manipulating knob 9 is set to either one of the emergency positions, that is, either the maximum heating position FH or the maximum cooling position FC, the movable contact piece 10 is brought into contact with either the emergency contact 8H or 8C to thereby permit the emergency circuit 2 to operate in the corresponding mode.

However, the foregoing conventional arrangement is disadvantageous in that there is the tendency that the emergency circuit 2 may be rendered operative, even though the operator does not intend to do so, because of the fact that the manipulating switch 3 (5) has such a structure that the temperature controlling resistance layer 7 and emergency contacts 8H and 8C are located in flush relationship with each other so that the knob 9 is liable to be excessively turned to render the emergency circuit 2 operative when it is desired to keep the automatic control circuit 1 operating.

SUMMARY OF THE INVENTION

It is an object of the present invention to provide an improved control system for an automatic air conditioner of a motor vehicle, which is so designed as to overcome the aforementioned disadvantage of the prior-art arrangement.

Briefly stated, according to an aspect of the present invention, there is provided a control system for an air conditioner of a motor vehicle, which includes an automatic control circuit arrangement for controlling the air conditioner to enable it to operate at a desired level of heating or cooling. an emergency circuit arrangement is adapted, in case the automatic control circuit arrangement fails to work properly, for example, to cause it to be disconnected from the air conditioner and enable the latter to operate only at the maximum level of the heating or cooling performance thereof. A switch means is connected to selectively render operative a desired one of the aforementioned two circuit arrangements, and is provided with means for preventing the emergency circuit arrangement from being inadvertently rendered operative.

According to another aspect of the present invention, there is provided switch means which is connected to the automatic control circuit arrangement and emergency circuit arrangement and arranged to selectively assume a first position, a second position or any desired intermediate position. The switch means is also provided with discrimination means for producing discrimination between said first and second positions and said desired intermediate position, thereby making it possible to prevent the emergency circuit arrangement from being unintentionally rendered operative.

Thus, with the control system, according to the present invention, when the switch means is made to assume either the first position or the second position, the emergency circuit arrangement is energized to render the automatic control circuit arrangement inoperative with respect to the air condition so that the latter is enabled to operate at a desired level of heating or cooling performance thereof; whereas, when the switch means is made to assume the aforementioned intermediate position, the emergency circuit means is deenergized and the automatic control circuit arrangement is energized so that the air conditioner is enabled to operate at desired level of the heating or cooling performance thereof.

Other objects, features and advantages of the present invention will become apparent from the ensuing description taken in conjunction with the accompanying drawings.

DETAILED DESCRIPTION OF THE PREFERRED EMBODIMENTS

Figure 1:
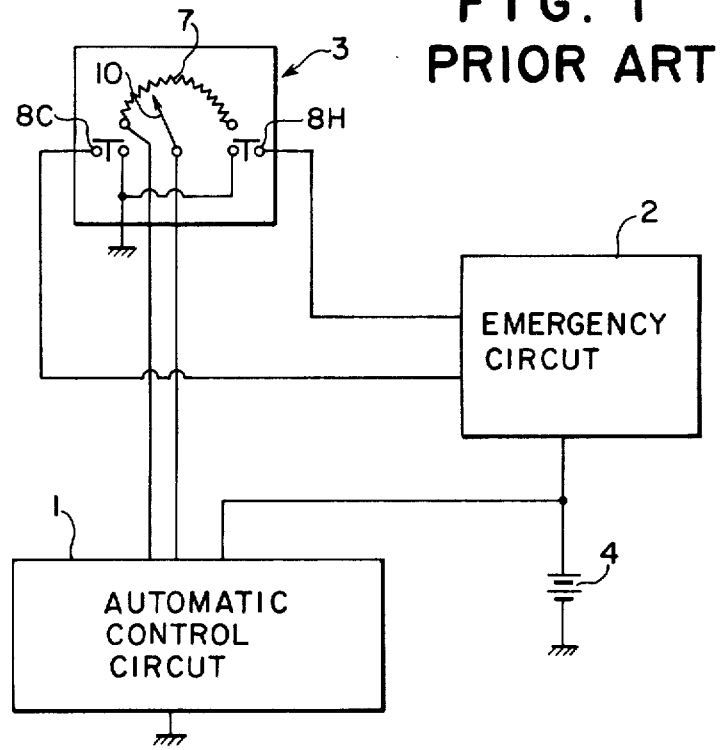
FIG. 1 illustrates schematically a hitherto known control system for an air conditioner of a motor vehicle.

The invention will now be described in conjunction with exemplary embodiments thereof by referring to the drawings.

Figure 4:
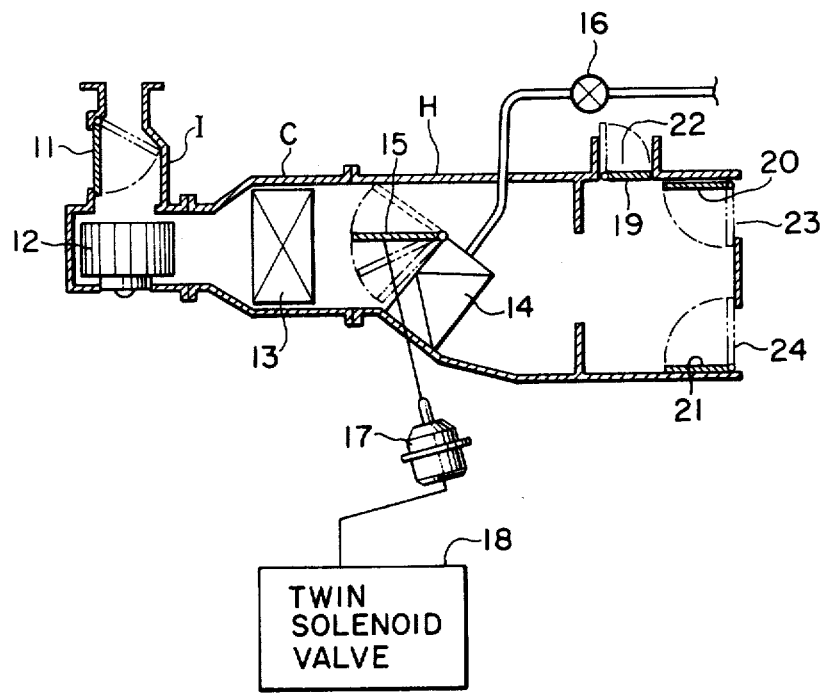
FIG. 4 illustrates schematically an air conditioner for a motor vehicle to which the invention may be applied.

Reference is made to FIG. 4 showing an air conditioner to which the invention can be applied. The air conditioner includes an air intake box 1 which incorporates therein an air intake door 11 for switchably controlling air intake from the exterior and/or the interior of the vehicle, a blower 12, a cooling unit C which is composed of an evaporator 13 adapted to be driven by a compressor (not shown in FIG. 4) and to execute a refrigerating cycle known per se, and a heater unit H which is composed of a heater core 14 through which engine coolant water is circulated and an air mixing door 15 for regulating air flow directed to the heater core 14. The air intake door 11, blower 12 evaporator 13, heater core 14 and air mixing door 15 are normally controlled by an automatic control circuit such as the one described above in connection with FIG. 1. They are controlled in emergency by an emergency circuit 2 which will be described hereinafter in an conjunction with FIG. 10. In FIG. 4, reference numeral 16 indicates a water cock, 17 designates a vacuum actuator for actuating the air mixing door 15 in response to signals supplied from a twin-solenoid vacuum valve 18, and numerals 19, 20 and 21 denote various air outlet ports. Reference numerals 22, 23 and 24 denote doors disposed at the outlet ports 19, 20 and 21 and will be referred to as a defrost door, vent doors and a floor door, respectively. These doors are also adapted to be opened and closed by respective vacuum actuators or the like (not shown) under the control of the automatic control circuit in the normal operation of the air conditioning system and by the emergency circuit in the case of an emergency.

Figure 2:
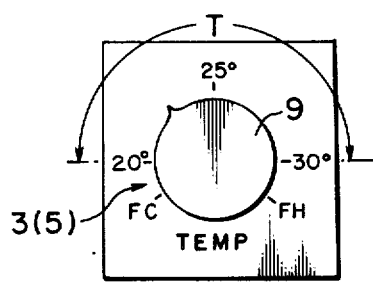
FIG. 2 illustrates schematically in a front view a typical manipulating switch used in the hitherto known control system.
Figure 3:
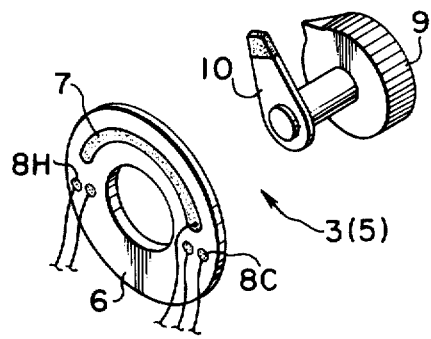
FIG. 3 is an exploded perspective view to illustrate a specific structure of the manipulating switch shown in FIG. 2.
Figure 5:
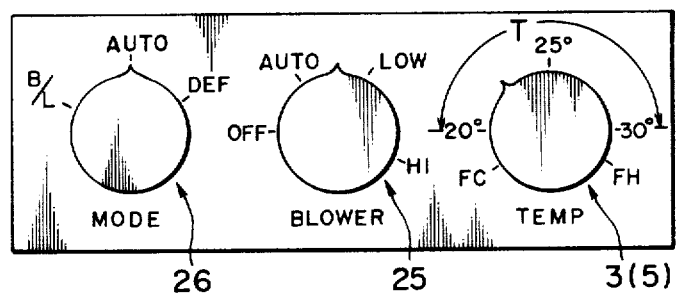
FIG. 5 is a front view of a control panel portion of the control system for the air conditioner shown in FIG. 4.

Referring to FIG. 5 which shows a manipulating portion of the air conditioning system to which the invention can be applied, reference numeral 3 denotes a manipulating switch which is implemented integrally with a temperature controlling switch 5 and serves for selectively connecting the automatic control circuit 1 and the emergency circuit 2. The manipulating switch denoted by reference symbol 3 (5) in FIG. 5 is operative not only in a temperature control range T but also at emergency positions FH and FC, as is in the case of the hitherto known manipulating switch described hereinbefore with reference to FIGS. 2 and 3. Reference numeral 25 designates a blower switch which has manually selectable positions labelled LOW, HI and OFF in addition to an automatic control position labelled AUTO at which the blower 12 is controlled by the automatic control circuit 1. Reference numeral 26 designates a mode selecting switch for selecting the air outlet ports 22, 23 and 24 of the air conditioner. This switch 26 is shown as having a manually selectable bi-level position labelled B/L and a defroster position labelled DFF in addition to an automatic control position labelled AUTO.

Figure 6:
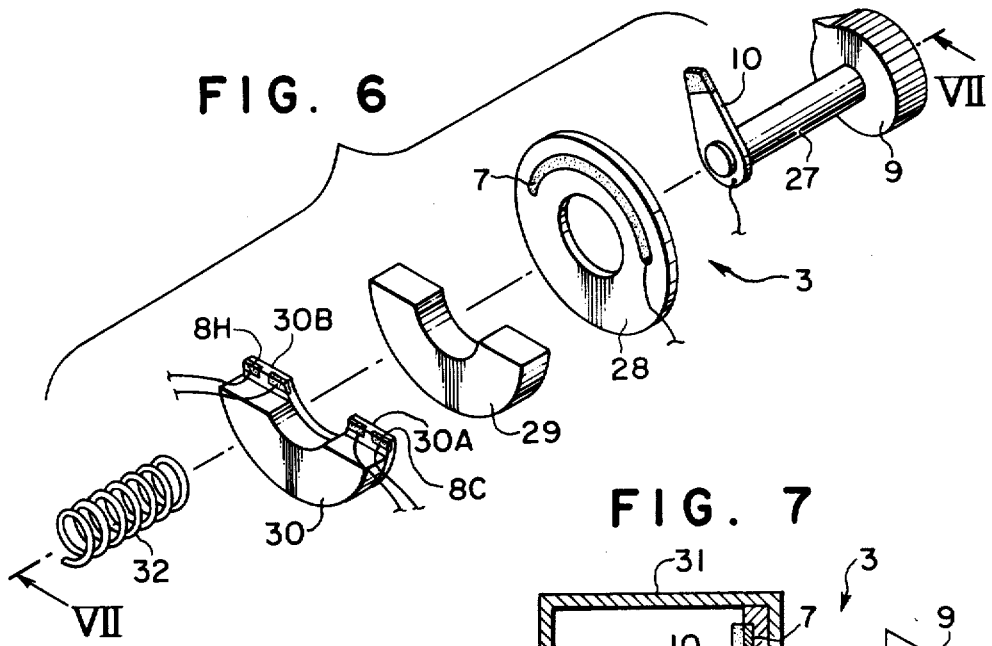
FIG. 6 is an exploded perspective view showing an exemplary structure of a manipulating switch provided at the control panel portion shown in FIG. 5 according to an exemplary embodiment of the invention.
Figure 7:
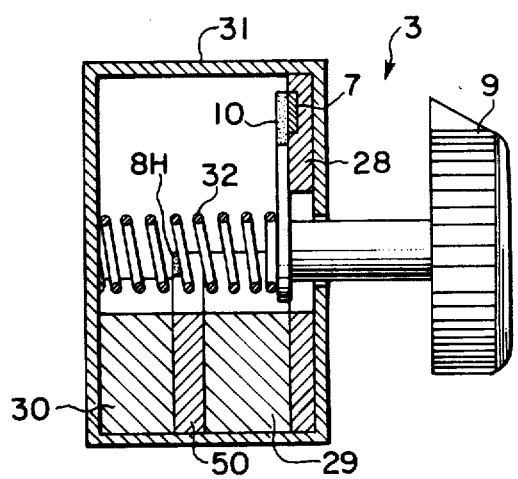
FIG. 7 is a sectional view taken along the line VII—VII in FIG. 6.

FIGS. 6 and 7 which show, in an exploded perspective view and a longitudinal sectional view respectively, a structure of the manipulating switch 3 according to an exemplary embodiment of the invention. Switch 3 is composed of a rotatable manipulating knob 9 having a shaft 27 extending from a rear face at a center thereof and provided with a movable contact piece 10 fixedly mounted at the free end of the shaft 27. Switch 3 has a base member comprising a first base plate 28 in the form of an annular disc disposed near the manipulating knob 9 and having a temperature controlling resistance layer 7 of an arcuate configuration deposited on the rear surface of the disc 28 and adapted to be electrically connected to the automatic control circuit 1, a semi-annular spacer 29 juxtaposed in contact with the rear surface of the first base plate 28 at such a position that the arcuate resistance layer 7 is not covered with the spacer 29, and a second base plate 30 having a configuration substantially similar to that of the semi-annular spacer 29 and juxtaposed in contact and in alignment with the rear surface of the latter. Both flat upper ends of the second base plate 30 are provided with a pair of upstanding ears 30A and 30B, respectively, at which emergency contacts 8C and 8H are fixedly disposed and electrically connected to the emergency circuit 2, as can be seen from FIG. 6. To this end, a C-shaped contact supporting plate 50 having two legs may be separately prepared and combined with the second base plate 30, with the emergency contact 8C and 8H being fixedly attached to the leg portions, as clearly seen in FIGS. 7, 8 and 9. The first base plate 28, the spacer 29 and the second base plate 30 are contained within a switch case 31 in juxtaposed relationship with each other, wherein a compression coil spring 32 is interposed between the free end of the shaft 27 of the knob 9 and an opposite inner wall of the case 31 to press resiliently the movable contact piece 10 mounted on the knob shaft 27 against the rear surface of the first base plate 28, as will be seen in FIG. 7.

Figure 8:
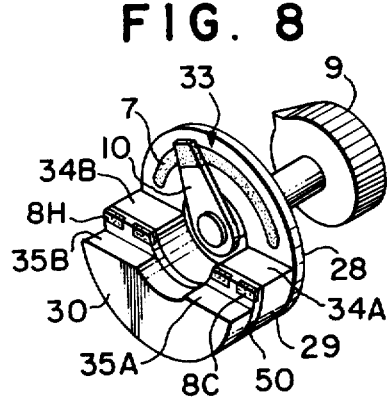
FIG. 8 is a perspective view showing the manipulating switch in a temperature controlling state.
Figure 9:
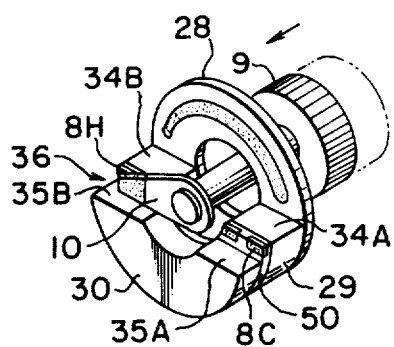
FIG. 9 is a view similar to FIG. 8 and shows the manipulating switch in an emergency operation state.

With the structure of the manipulating switch 3 described above, when the automatic control circuit 1 is operated, the manipulating knob 9 may simply be rotated within the temperature control range T shown in FIGS. 5, 7 and 8. In this operation, the movable contact piece 10 is urged to constantly bear on the rear surface of the first base plate 28 under the biasing action of the spring 32 and caused to be slidingly displaced in contact with the temperature controlling resistance layer 7 by rotating the manipulating knob 9. In this way, a contact mechanism for the automatic temperature control denoted by a numeral 33 is constituted through cooperation of the manipulating knob assembly (9, 10, 27) and the first base plate assembly (28, 7), whereby the automatic control circuit 1 is operated on the basis of the resistance value of the resistor layer 7 selected through manipulation of the knob 9. When the manipulating knob 9 is rotated to the maximum heat output position in the controllable temperature range T, the movable contact piece 10 will be disposed in abutment with a stopper end face 34B formed at one of the top ends of the spacer 29 (refer to FIG. 8). In a similar manner, the maximum cooling output position of the manipulating knob in the automatic temperature control range T is defined by a stopper end face 34A formed by the other leg of the C-like spacer 29. In this way, the range over which the manipulating knob 9 can be rotated in the automatic temperature control operation is definitely delimited. On the other hand, when the emergency circuit 2 is to be operated, the manipulating knob 9 is pushed in against the force of the spring 32 by a distance slightly greater than the thickness of the spacer 29 and rotated to the emergency position FH or FC in the pushed state. In other words, the manipulating knob 9 is pushed to such a degree that the movable contact piece 10 is positioned to the rear side of the upstanding ears at which the emergency contact 8H and 8C are fixedly mounted, and subsequently the knob 9 is rotated toward the emergency position FH or FC. In this connection, it will be noted that end or top surfaces 35A and 35B serve as stoppers to allow the movable contact pieces 10 to be positioned positively in contact with the emergency contact 8C or 8H. In this manner, a contact mechanism 36 for operation of the air conditioner in an emergency is realized through cooperation of the manipulating knob 9 and the contacts 8C and 8H provided on the second base plate 30. At the emergency position FH or FC, the air conditioner is operated only at the maximum level of the heating or cooling performance thereof under the command of the emergency circuit 2.

Figure 10:
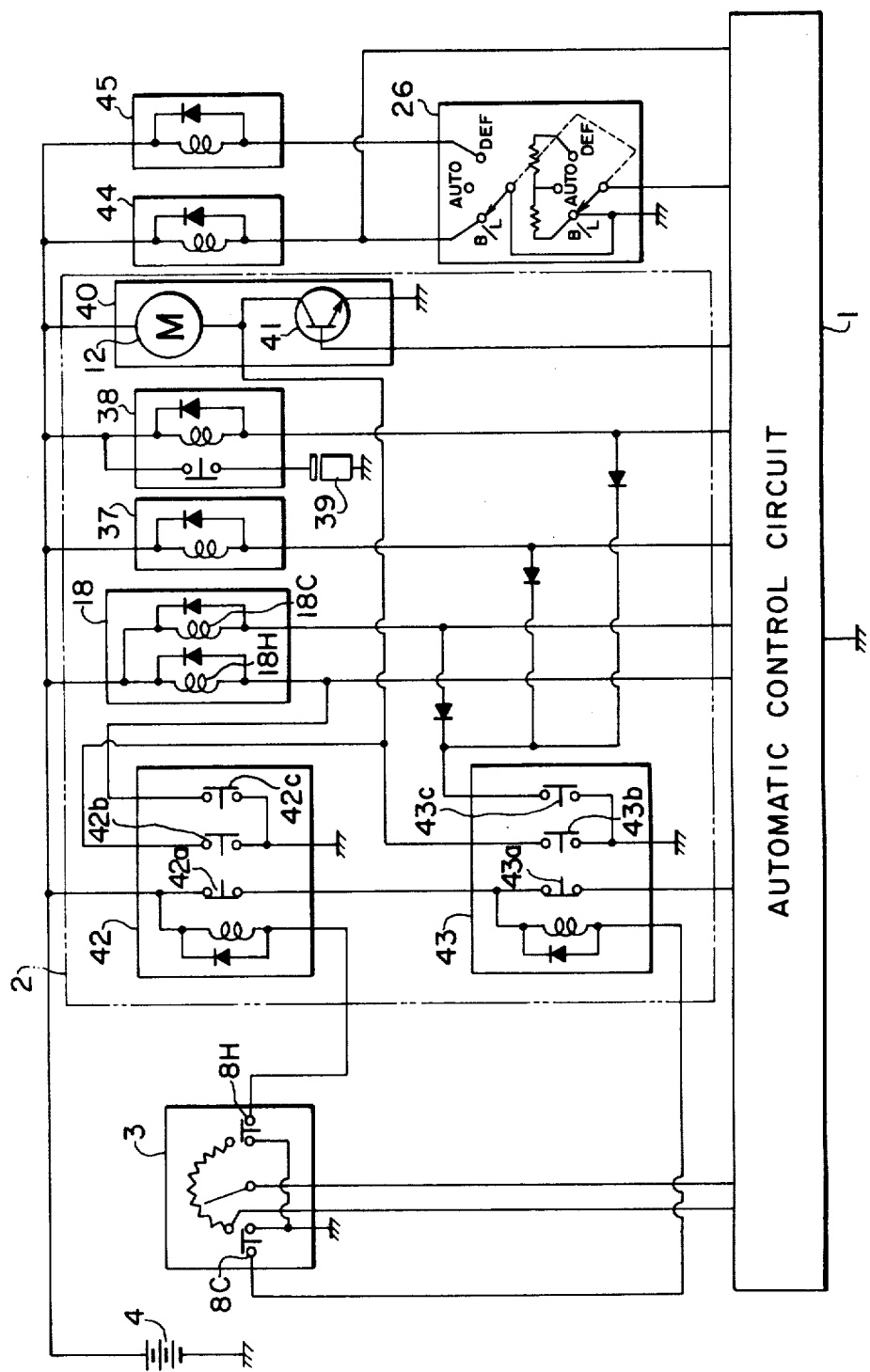
FIG. 10 is a circuit diagram showing an arrangement of an emergency circuit according to an exemplary embodiment of the invention.

As exemplary embodiment of the emergency circuit 2 is illustrated in FIG. 10. In this figure, reference numeral 1 denotes an automatic control circuit which may be of the conventional type, and reference numeral 3 denotes generally the manipulating switch having the emergency contacts 8C and 8H described above. Reference numeral 18 denotes the twin solenoid vacuum valve for controlling operation of the vacuum actuator 17 shown in FIG. 4, a numeral 37 denotes a relay for actuating the water cock 16, a numeral 38 denotes a relay for controlling or turning on or off a compressor 39, numeral 40 denotes a blower circuit including the blower 12 and a control circuitry represented by a switching transistor 41, and reference numeral 42 denotes a relay adapted to be energized upon closing of the switch 3 to the emergency contact 8H for turning on the air conditioner in the maximum heating output mode. This relay may be referred to as the hot relay and has one normally closed contact 42a and two normally opened contacts 42b and 42c. The normally closed contact 42a is connected in series to the automatic control circuit 1 and a power supply source 4, while the normally opened contacts 42b and 42c are provided in lines leading, respectively, to the blower circuit 40 and a solenoid 18H of the twin solenoid valve 18 which actuates, upon being energized, the vacuum valve 18 in such a direction that the vacuum actuator 17 sets the air mixing door 15 to the full heating position indicated by a broken line in FIG. 4. This solenoid may be referred to as hot solenoid. Reference numeral 43 denotes a relay adapted to turn on the air conditioner in the maximum cooling output mode, when the manipulating switch 3 is closed to the emergency contact. This relay may be referred to as cold relay and has one normally closed contact 43a and two normally open contacts 43b and 43c, wherein the normally closed contact 43a is inserted in series between the power supply source 4 and the automatic control circuit 1, while the normally open contact 43b is connected to the blower circuit 40. The other normally open contact 43c is connected to a solenoid 18c of the twin solenoid valve 18 which actuates, upon being energized, the vacuum valve 18 in such a direction that the vacuum actuator 17 sets the air mixing door 15 to the full cooling position indicated by a dotted broken line in FIG. 4. This solenoid 18c may be referred to as cold solenoid. Furthermore, the normally open contact 43c is connected to the solenoid valve 37 for actuating the water cock 16 and a relay coil of the control relay 38 for the compressor 39.

Description will next be made of the operation of the emergency circuit 2. When the air conditioner is to be operated in the maximum heating output mode, i.e., at the maximum level of the heating performance thereof, the emergency contact 8H is closed through the operation of the manipulating switch 3 described hereinbefore. The relay coil of the hot relay 42 is energized, resulting in that the normally closed contact 42a is opened to interrupt power to the automatic control circuit 1, whereby the latter is rendered inoperative. In this connection, it should be mentioned that, in the case of the hitherto known air conditioning system, the power supply to the automatic control circuit remains alive, even when the emergency circuit 2 is turned on, as the result of which reliability can not be always assured in the operation of the emergency circuit 2. In contrast, in the case of the illustrated embodiment, operation of the emergency circuit can be assured without fail. Further, the normally open contacts 42b and 42c of the hot relay 42 are simultaneously closed, whereby the blower circuit 40 is turned on, while the hot solenoid 18H of the twin solenoid vacuum valve 18 is energized to thereby cause the vacuum actuator 17 to set the air mixing door at the fully opened position (corresponding to the maximum heating operation) indicated by the bloken line in FIG. 4.

On the other hand, when the air conditioner is to be operated in the maximum cooling mode i.e., at the maximum level of the cooling performance thereof, in the case of emergency, for example, the emergency contact 8C is turned on through corresponding manipulation of the switch 3, as the result of which the relay coil of the cold relay 43 is electrically energized. Then, the normally closed contact 43a of the relay 43 is opened to break the power supply to the automatic control circuit 1 from the power source 4. At the same time, the normally open contacts 43b and 43c are closed to actuate the blower 12 and energize the cold solenoid 18C of the twin solenoid vacuum valve 18, respectively. The valve 18 will then actuates the vacuum actuator 17 to thereby set the air mixing door to the fully closed position (corresponding to the maximum cooling operation) indicated by the dotted broken line in FIG. 4. Additionally, the water cock 16 is closed to block the circulation of engine cooling water through the heater core 14, while the compressor 39 is driven to actuate the evaporator 13.

In the illustrated embodiment, the mode switch 26 is implemented in such a structure that the automatic control circuit 1 is rendered operative at the position labelled "AUTO", while at the bi-level position labelled with "B/L" the automatic control circuit is rendered inoperative and the bi-level condition, in which the vent door 20 and the floor door 21 are fully opened with the defroster door 19 being fully closed, can be established. At the position labelled "DEF", a defrosting condition is established in which only the defroster door 19 is fully opened with all the doors closed. The vent door 20 and the floor door 21 are actuated with the aid of a solenoid means 44 while the defroster door 19 is actuated by a solenoid means 45.

Furthermore, in the illustrated embodiment, the manipulating switch 3 is so constituted that the manipulating knob 9 is pushed inwardly when the emergency position FH or FC is to be established. However, it will be appreciated that the invention is not restricted to such structure. For example, it will readily occur to those skilled in the art to implement the switch 3 in such a structure that the emergency position FH or FC can be selected by pulling rather than pushing the manipulating knob 9. The invention may also be applied to a switch structure where a manipulating lever of a slide type is made use of in place of the rotatable manipulating knob 9. Further, the invention can be implemented by using an emergency circuit of another arrangement inclusive of the hitherto known circuit. Besides, the modes selectively set by the mode switch 12 are not restricted to those illustrated. For example, there may be additionally provided a vent mode in which only the vent door 20 is fully opened, a heating mode in which only the floor door 21 is fully opened and others.

While the present invention has been described and illustrated with respect to specific embodiments thereof, it is to be understood that the present invention is by no means limited thereto but covers all changes and modification which will become possible within the scope of the appended claims.

What is claimed is:

1. A control system for an air conditioner of a motor vehicle, comprising:

automatic control circuit means operative to enable said air conditioner to operate within a range of desired levels of heating or cooling performance thereof;

emergency circuit means operative to enable said air conditioner to operate only at the maximum level of heating or cooling performance thereof, said emergency circuit means including first and second normally closed contact means through which power is supplied to said automatic control circuit means; and switch means connected to said automatic control circuit means and said emergency circuit means, said switch means including:

first and second fixed contact means provided in spaced relationship with each other in a first plane and electrically connected to said first and second normally closed contact means of said emergency circuit means;

third fixed elongate contact means provided intermediate between said first and second fixed contact means in a second plane disposed in substantially parallel spaced relationship with said first plane, said third fixed elongate contact means being electrically connected to said automatic control circuit means;

movable contact means carried on a rotary shaft which is spring-biased in the axial direction thereof, so that said movable contact means is normally disposed in slidable contact with said third fixed contact means, said movable contact means being arranged to be rotated with said rotary shaft about the axis of said rotary shaft so as to be selectively disposed into engagement with one of said first, second and third fixed contact means, said movable contact means being also arranged to be displaceable with said rotary shaft against said spring-bias in the axial direction of said rotary shaft; and means provided between said first and second planes for blocking further rotation of said movable contact means beyond either end of said third fixed elongate contact means unless said movable contact means is displaced against said spring-bias, thereby preventing said movable contact means from being unintentionally brought into engagement with either one of said first and second fixed contact means;

wherein when said movable contact means is disposed in engagement with said third fixed contact means, said automatic control circuit means is energized to enable said air conditioner to operate within said desired levels of the heating or cooling performance thereof, while said emergency circuit means is deenergized; and wherein when said movable contact means is disposed into engagement with either one of said first and second fixed contact means while being displaced against said spring-bias, the associated one of said first and second normally closed contact means of said emergency circuit means is opened to interrupt the power supply to said automatic control circuit means so that the latter is deenergized, while said emergency circuit means is energized to enable said air conditioner to operate at the maximum level of heating or cooling performance thereof.

2. A switch device for use in a control system for an air conditioner of a motor vehicle having an automatic control circuit means operative to enable said air conditioner to operate within a range of desired levels of heating or cooling performance thereof, and an emergency circuit means operative to enable said air conditioner to operate only at the maximum level of heating or cooling performance thereof, said emergency circuit means including first and second normally closed contact means through which power is supplied to said automatic control circuit means, said switch device connected to said automatic control circuit means and said emergency circuit means and comprising:

(a) a base member having a first and a second surface portion each located in a first plane, a third surface portion located in a second plane substantially parallel to and axially deviated from said first plane, and a center aperture formed through said third surface portion;

(b) a first fixed contact member provided on said first surface portion;

(c) a second fixed contact member provided on said second surface portion;

(d) said first and second contact members electrically connected to said first and second normally closed contact means of said emergency circuit;

(e) a third fixed contact member provided on said third surface portion and being electrically connected to said automatic control circuit;

(f) a rotary shaft member rotatably and axially displaceably inserted through said center aperture;

(g) a movable contact member provided on said rotary shaft member at one end thereof;

(h) a manipulation knob member provided on said rotary shaft member at the other end thereof;

(i) said rotary shaft member being normally spring-biased so that said movable contact member is disposed in slidable contact with said third fixed contact member, said rotary shaft member being also adapted to be displaced axially, against said biasing action, and rotationally so as to permit said movable contact member to be selectively disposed into contact with desired one of said first and second fixed contact members; and (j) means provided between said first and second planes for blocking further rotation of said movable contact member beyond either end of said third fixed contact member unless said movable contact means is displaced against said spring-bias, thereby preventing said movable contact member from being unintentionally brought into engagement with either one of said first and second fixed contact members;

(k) wherein said movable contact member is disposed in engagement with said third fixed contact member, said automatic control circuit means is energized to enable said air conditioner to operate within said desired levels of the heating or cooling performance thereof, while said emergency circuit is deenergized; and (l) wherein when said movable contact member is disposed into engagement with either one of said first and second fixed contact members while being displaced against said spring-bias, the associated one of said first and second normally closed contact means of said emergency circuit means is opened to interrupt the power supply to said automatic control circuit means so that the latter is deenergized, while said emergency circuit means is energized to enable said air conditioner to operate at the maximum level of heating or cooling performance thereof.

3. A switch device according to claim 2, wherein said base member comprises a first semi-annular element defining said first and second surface portions and a second annular element defining said third surface portion, said center aperture being formed through said second annular element, wherein said first and second elements are disposed in juxtaposed relationship with each other, with said first and second surface portions being located in said first plane and with said third surface portion being located in said second plane.

4. A switch device according to any of claims 3 or 2, wherein said third fixed contact member comprises an arcuate resistance layer provided on said third surface portion.

* * * * *